United States Patent
Bruce et al.

(10) Patent No.: US 11,120,669 B2
(45) Date of Patent: Sep. 14, 2021

(54) MEDIA DEPOSITORY

(71) Applicant: NCR Corporation, Duluth, GA (US)

(72) Inventors: Joshua Bruce, Guelph (CA); Fredrik L. N. Kallin, Waterloo (CA); Robert Ross, Waterloo (CA); Abhay Fernandez, London (CA); Mathew Joseph, Waterloo (CA); Ahmed Mezil, St. Catharines (CA)

(73) Assignee: NCR Corporation, Atlanta, GA (US)

( * ) Notice: Subject to any disclaimer, the term of this patent is extended or adjusted under 35 U.S.C. 154(b) by 225 days.

(21) Appl. No.: 14/090,407

(22) Filed: Nov. 26, 2013

(65) Prior Publication Data

US 2015/0144455 A1 May 28, 2015

(51) Int. Cl.

| | | |
|---|---|---|
| *G07F 19/00* | (2006.01) | |
| *G07D 11/40* | (2019.01) | |
| *G06K 9/18* | (2006.01) | |
| *G07D 7/04* | (2016.01) | |
| *G07D 7/0043* | (2016.01) | |

(Continued)

(52) U.S. Cl.
CPC .......... *G07F 19/202* (2013.01); *B23K 26/402* (2013.01); *G06K 9/18* (2013.01); *G06K 9/186* (2013.01); *G07D 7/0043* (2017.05); *G07D 7/0047* (2017.05); *G07D 7/04* (2013.01); *G07D 11/30* (2019.01); *G07D 11/40* (2019.01); *G07F 19/203* (2013.01)

(58) Field of Classification Search
CPC .. G07D 2207/00; G07D 2211/00; G07D 7/00; G07D 7/06; G07D 7/12; G07D 11/30; G07D 7/0047; G07D 7/0043; G07D 7/04; G07D 11/40; G07F 7/00; G07F 7/02; G07F 7/04; G07F 7/10; G07F 19/202; G07F 19/203; G07F 7/20; B65H 2701/1912; B23K 26/402; G06K 9/186; G06K 9/18

USPC .................. 194/206–213; 209/534; 235/379
See application file for complete search history.

(56) References Cited

U.S. PATENT DOCUMENTS

| | | | |
|---|---|---|---|
| 5,109,153 A | | 4/1992 | Johnsen et al. |
| 5,422,467 A | * | 6/1995 | Graef ...................... B65H 29/58 198/358 |

(Continued)

FOREIGN PATENT DOCUMENTS

| | | |
|---|---|---|
| CN | 1807112 A | 7/2006 |
| CN | 101631734 A | 1/2010 |

(Continued)

OTHER PUBLICATIONS

Leal-Ayala, D.R. et al., "Toner-print removal from paper by long and ultrashort pulsed lasers", Proceedings of The Royal Society, Proc. R. Soc. A (2012) 468, 2272-2293, doi:10.1098/rspa.2011.0601, Mar. 14, 2012.. (Year: 2012).*

(Continued)

*Primary Examiner* — Jeffrey A Shapiro
(74) *Attorney, Agent, or Firm* — Schwegman, Lundberg & Woessner

(57) ABSTRACT

A media depository is described. The media depository comprises: a media item validation module; a diverter for routing a received media item via either a storage path or a return path; an escrow for temporarily holding received media items; and a printer located between the diverter and the escrow so that the printer can print on any media items transported via the return path.

9 Claims, 6 Drawing Sheets

(51) Int. Cl.
*G07D 7/0047* (2016.01)
*G07D 11/30* (2019.01)
*B23K 26/402* (2014.01)

(56) References Cited

U.S. PATENT DOCUMENTS

| | | | | |
|---|---|---|---|---|
| 5,965,862 | A * | 10/1999 | Momose | B41J 3/44 |
| | | | | 235/439 |
| 6,017,661 | A | 1/2000 | Lindsay et al. | |
| 6,474,549 | B2 * | 11/2002 | Katou | B65H 29/006 |
| | | | | 235/379 |
| 6,637,647 | B2 * | 10/2003 | Katou | B65H 29/006 |
| | | | | 235/379 |
| 7,748,615 | B2 | 7/2010 | VanKirk et al. | |
| 8,251,404 | B2 | 8/2012 | Depta et al. | |
| 8,693,064 | B2 * | 4/2014 | Brewington | B41J 29/26 |
| | | | | 358/448 |
| 8,733,531 | B2 * | 5/2014 | Iwamura | B65H 29/006 |
| | | | | 194/206 |
| 2002/0088850 | A1 * | 7/2002 | Katou | B65H 29/006 |
| | | | | 235/379 |
| 2002/0092905 | A1 * | 7/2002 | Katou | B65H 29/006 |
| | | | | 235/379 |
| 2003/0116622 | A1 * | 6/2003 | Suttle et al. | 235/379 |
| 2006/0086528 | A1 * | 4/2006 | Clare | G06K 19/06018 |
| | | | | 174/122 G |
| 2006/0141391 | A1 * | 6/2006 | Klein | G06K 1/121 |
| | | | | 430/270.1 |
| 2008/0023539 | A1 * | 1/2008 | Rao | G07F 19/20 |
| | | | | 235/379 |
| 2008/0188841 | A1 * | 8/2008 | Tomasello | A61B 18/24 |
| | | | | 606/11 |
| 2008/0191463 | A1 * | 8/2008 | Vermeulen | G02B 3/08 |
| | | | | 283/110 |
| 2009/0075199 | A1 * | 3/2009 | Lungu | B41C 1/05 |
| | | | | 430/281.1 |
| 2009/0087076 | A1 * | 4/2009 | Jenrick | G07D 7/00 |
| | | | | 382/135 |
| 2009/0145959 | A1 * | 6/2009 | VanKirk et al. | 235/379 |
| 2009/0236412 | A1 * | 9/2009 | Amorim | 235/379 |
| 2009/0321676 | A1 * | 12/2009 | Breton | C09D 11/322 |
| | | | | 252/62.53 |
| 2009/0325098 | A1 * | 12/2009 | Veregin | G03G 9/0804 |
| | | | | 430/108.3 |
| 2010/0019027 | A1 * | 1/2010 | Connell et al. | 235/379 |
| 2010/0090397 | A1 * | 4/2010 | Taniguchi | 271/303 |
| 2010/0161111 | A1 * | 6/2010 | Davis | B07C 5/344 |
| | | | | 700/215 |
| 2010/0213023 | A1 * | 8/2010 | Freitag et al. | 194/206 |
| 2011/0148029 | A1 * | 6/2011 | Connell et al. | 271/145 |
| 2012/0007304 | A1 * | 1/2012 | Wilson et al. | 271/10.01 |
| 2012/0175415 | A1 * | 7/2012 | VanKirk | G06Q 20/042 |
| | | | | 235/379 |
| 2012/0268547 | A1 * | 10/2012 | Collins | G01N 35/00732 |
| | | | | 347/224 |
| 2012/0305362 | A1 * | 12/2012 | Iwamura | B65H 29/006 |
| | | | | 194/206 |
| 2013/0200606 | A1 * | 8/2013 | Omar | B41M 3/14 |
| | | | | 283/74 |
| 2013/0274614 | A1 * | 10/2013 | Shimada | A61B 5/4836 |
| | | | | 600/483 |
| 2014/0003849 | A1 * | 1/2014 | Liu | G03G 15/2021 |
| | | | | 399/341 |
| 2014/0204426 | A1 * | 7/2014 | Levi | 358/3.26 |
| 2014/0238815 | A1 * | 8/2014 | Iwamura | G07F 7/04 |
| | | | | 194/206 |

FOREIGN PATENT DOCUMENTS

| | | |
|---|---|---|
| CN | 103103880 A | 5/2013 |
| EP | 2378491 | 10/2011 |
| WO | WO/2012/110586 | 8/2012 |

OTHER PUBLICATIONS

European Office Action dated Jan. 22, 2018 in co-pending European Patent Application 14182916.8.

\* cited by examiner

MEDIA DEPOSITORY

FIELD OF INVENTION

The present invention relates to a media depository. In particular, the invention relates to an intelligent media depository that recognizes deposited media items.

BACKGROUND OF INVENTION

Intelligent media depositories are used to receive media items, such as checks, banknotes, tickets, or the like. Some intelligent media depositories are incorporated into automated teller machines (ATMs) to allow an ATM customer to insert checks and/or banknotes, and to credit the customer's account based on the inserted checks and to authenticate the deposited banknotes then credit them to the customer's account.

To prevent storage within the intelligent media depository from filling up too quickly, it is desirable to return checks to the customer once these checks have been deposited. However, there must be no possibility of these checks being presented a second time.

SUMMARY OF INVENTION

Accordingly, the invention generally provides methods, systems, apparatus, and software for improving media handling within a media depository.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a media depository comprising: a media item validation module; a diverter for routing a received media item via either a storage path or a return path; an escrow for temporarily holding received media items; and a printer located between the diverter and the escrow so that the printer can print on any media items transported via the return path.

In some known media depositories the printer is located between the escrow and a storage module. This enables the printer to endorse checks as they travel towards the storage module. It is possible to print on media items before returning them to the customer, but the media item has to be backed up (transported in a reverse direction) after printing to get it into a rebuncher module, which is very slow. This aspect allows the printer to print on a media item prior to the media item reaching the diverter so that the media item does not need to be transported in a reverse direction after printing.

The media depository may further comprise a media item in/out port for receiving and returning media items; alternatively, the media depository may further comprise a media item input port and a separate media item output port.

The printer may comprise a laser operable to ablate toner and/or magnetic ink from checks to prevent the checks being presented a second time. The laser power is selected to vaporize the magnetic ink, while leaving the check substrate (that this, the paper) substantially undamaged. Once the magnetic ink has been vaporized, an optical scanner will be unable to detect the visible ink, and a MICR (magnetic ink character recognition) reader will be unable to detect the magnetic ink.

Alternatively, the printer may comprise an incoherent light source operable to ablate toner and/or magnetic ink from checks to prevent any checks presented a second time from being cashed or deposited.

The light source may be pulsed so that a higher intensity of light can be used without overheating the check substrate.

The media depository may further comprise a light source cut-off mechanism operable to turn off the light source in the event that the temperature at an area illuminated by the light source exceeds a predefined level.

According to a second aspect there is provided a self-service terminal including the media depository of the first aspect. The self-service terminal may comprise an automated teller machine (ATM), a self-checkout terminal (such as those used in retail, hotel, healthcare, car rental, and other industries), or the like.

According to a third aspect there is provided a method of transporting a media item within a media depository, the method comprising: receiving a media item at an input port; recognizing the received media item; routing the recognized media item to an escrow; transporting the recognized media item from the escrow towards a diverter; adjusting print on the recognized media item prior to the media item reaching the diverter using a printer located between the diverter and the escrow.

The step of adjusting print on the recognized media item may comprise adding print, such as endorsement data, cancellation data (such as a word "cancelled" or the like), or the like.

Alternatively, or additionally, the step of adjusting print on the recognized media item may comprise removing print from the recognized media item. This may be implemented using a light source (such as a laser, an LED, or the like). The removed print may comprise visible ink and/or magnetic ink.

According to a fourth aspect there is provided a method of transporting a media item within a media depository, the method comprising: receiving a media item at an input port; routing the received media item to an escrow; transporting the received media item from the escrow towards a diverter; and adjusting print on the received media item prior to the media item reaching the diverter.

The print on the received media item may be adjusted using a printer (for adding print data), an ablation mechanism (for removing print data), or a combined printer/ablator. A combined printer/ablator (which may be referred to as a printer) may print data, ablate data, or both print data indicating that a media item is void and also ablate data from that media item.

According to a fifth aspect there is provided a method of cancelling a media item received in a media depository from a customer, the method comprising: receiving a media item at an input port; processing the received media item to provide a cash value therefor; adjusting print on the processed media item; and returning the print adjusted media item to the customer.

The print on the processed media item may be adjusted using a printer (for adding print data), an ablation mechanism (for removing print data), or a combined printer/ablator. A combined printer/ablator (which may be referred to as a printer) may print data, ablate data, or both print data indicating that a media item is void and also ablate data from that media item.

Processing the received media item to provide a cash value therefor may comprise crediting a customer account with a value associated with the media item (for example, a value written or printed on the media item) or providing a cash equivalent to the customer. The cash equivalent may be less than an amount stated on the media item (for example, by a transaction fee levied on the transaction).

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
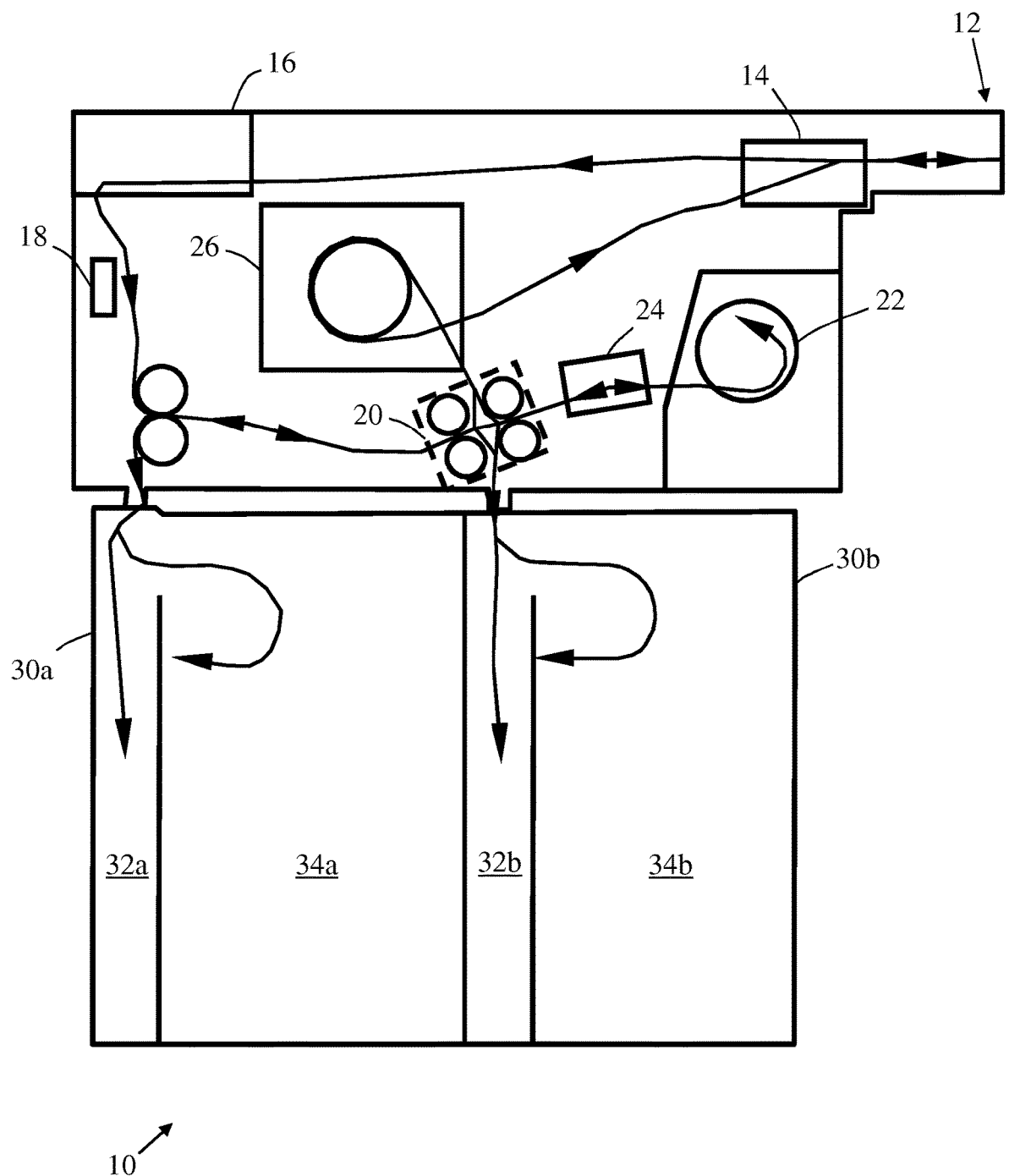
FIG. 1 is a schematic diagram of a media depository according to one embodiment of the present invention, illustrating various paths that can be taken by deposited media items.

Reference is first made to FIG. 1, which is a schematic diagram of a media depository 10 (in the form of a combined check and banknote depository) according to one embodiment of the present invention. The media depository 10 is suitable for incorporation into a self-service terminal (not shown in FIG. 1).

The media depository 10 comprises: an in/out port 12 for receiving media items (as a mixed bunch, as individual items, as a bunch of banknotes, or as a bunch of checks), an item separator/presenter module 14, a media item recognition and validation module (also known as a media item validator or MIV) 16, a MICR (magnetic ink character recognition) reader 18, a four-way diverter 20, an escrow 22 for temporarily storing deposited media items until the customer decides whether to complete or cancel a transaction involving those media items, a printer 24 located between the four-way diverter 20 and the escrow 22, and a rebuncher module 26.

Two storage modules (or bins) 30 are illustrated in FIG. 1. Each storage module 30 comprises a reject compartment 32 and a main storage compartment 34. One of these bins (for example, bin 30a) may be used to store checks, the other bin (for example, bin 30b) may be used to store banknotes. Alternatively, as in this embodiment, both bins 30 store banknotes, and checks are returned to the customer who deposited them at the end of each check deposit transaction.

A number of different pathways are provided within the media depository 10. Some of these are illustrated in FIGS. 2 to 4.

Figure 2:
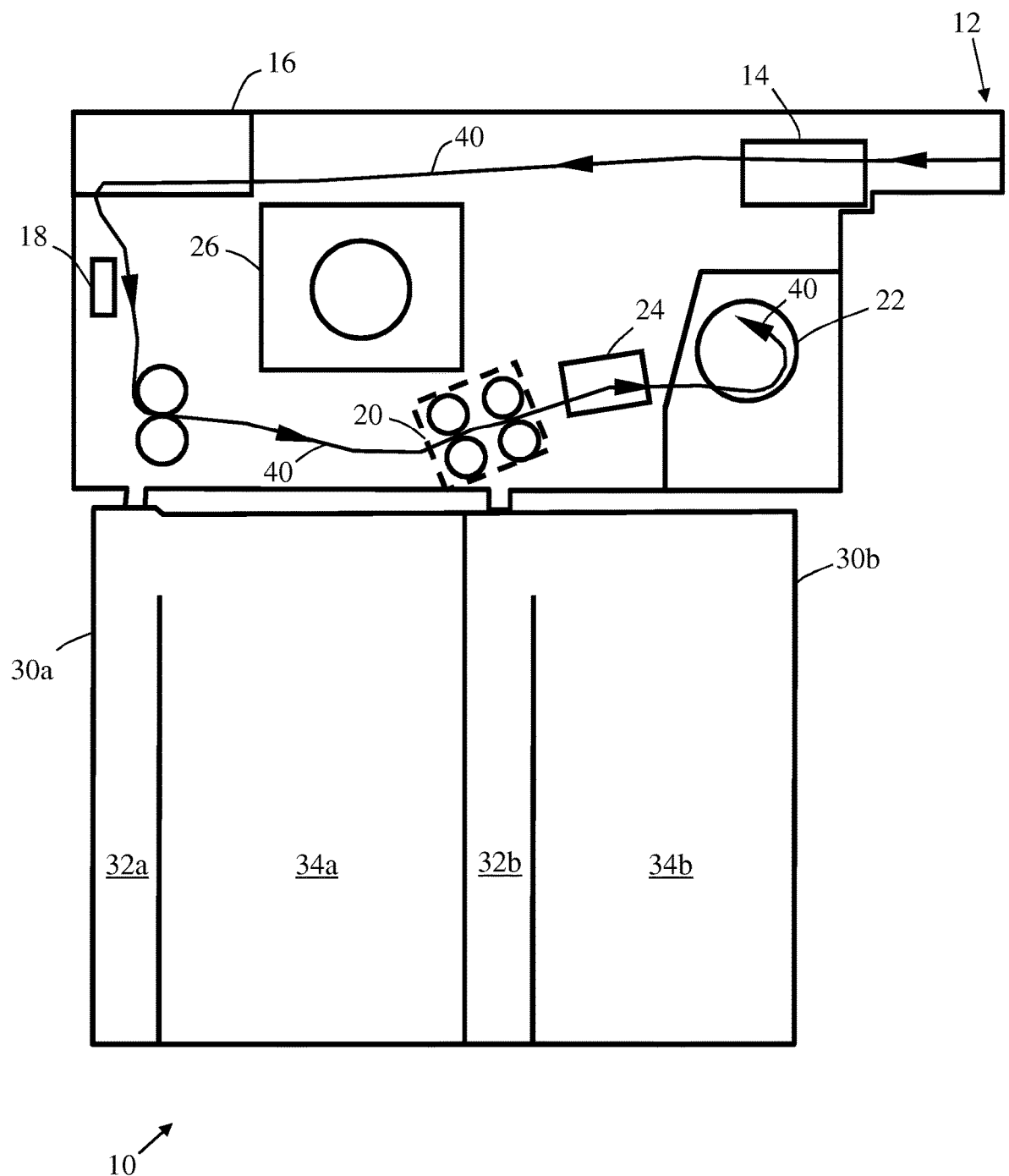
FIG. 2 is a schematic diagram of the media depository of FIG. 1, illustrating a media item input path.

FIG. 2 illustrates a media item input path 40, in which a deposited media item bunch is transported from the in/out port 12 to the item separator/presenter module 14. This item separator/presenter module 14 strips individual media items from the received bunch. These individual media items are then transported, via the MIV 16 (which identifies the media item as a check or a banknote, and in the case of a banknote it authenticates the banknote), the MICR reader 18, and the four-way diverter 20, into the escrow 22.

Figure 3:
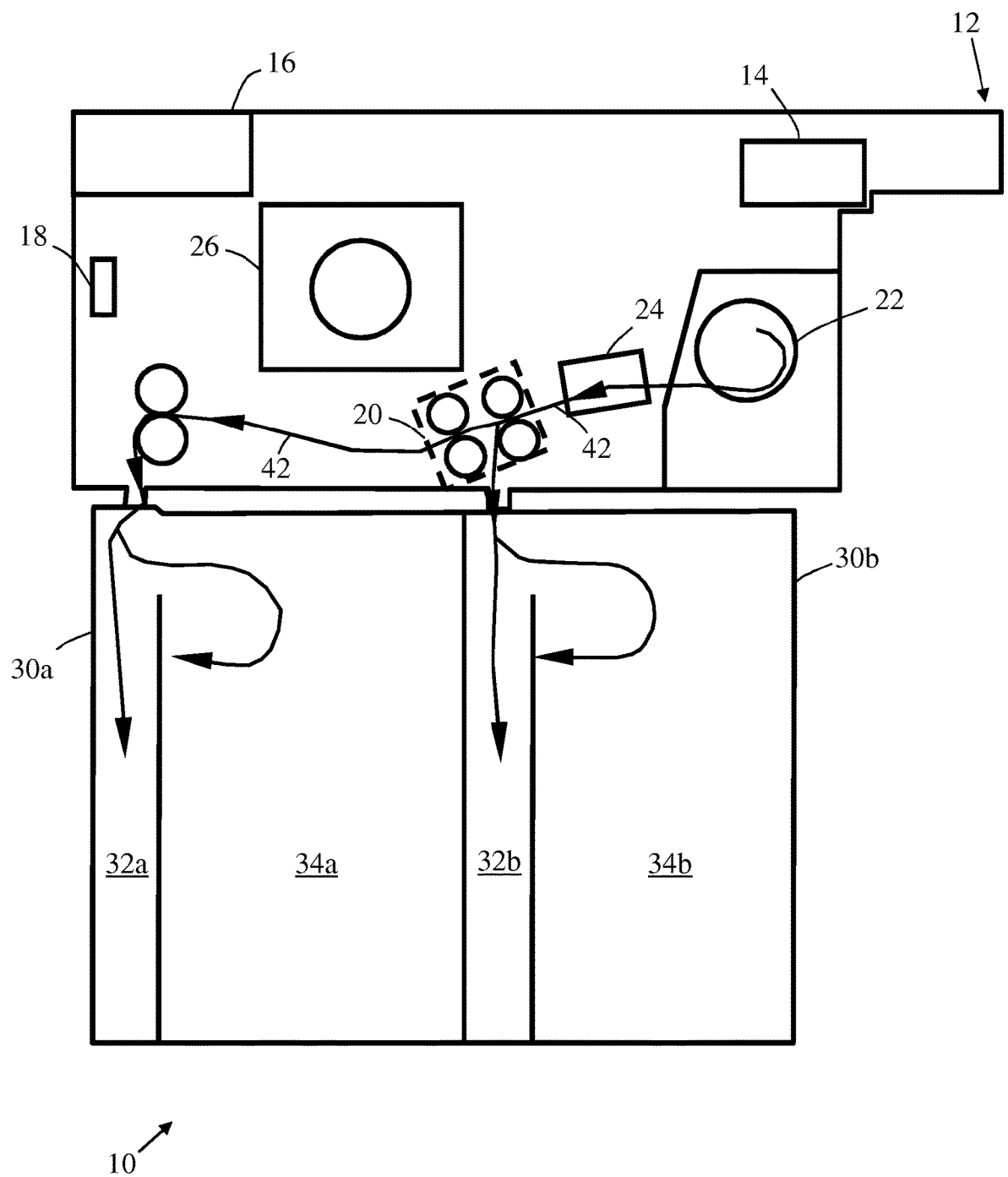
FIG. 3 is a schematic diagram of the media depository of FIG. 1, illustrating media item storage paths.

FIG. 3 illustrates media item storage paths 42. Although only one reference numeral 42 is used, there are multiple distinct media item storage paths, as illustrated in FIG. 3. All of the media item storage paths start at the escrow 22 and lead to the four-way diverter 20. The four-way diverter 20 may divert the media item to the first storage bin 30a or the second storage bin 30b. Furthermore, the four-way diverter 20 may divert the media item to either the reject compartment 32 or the main compartment 34 of each storage bin 30.

Figure 4:
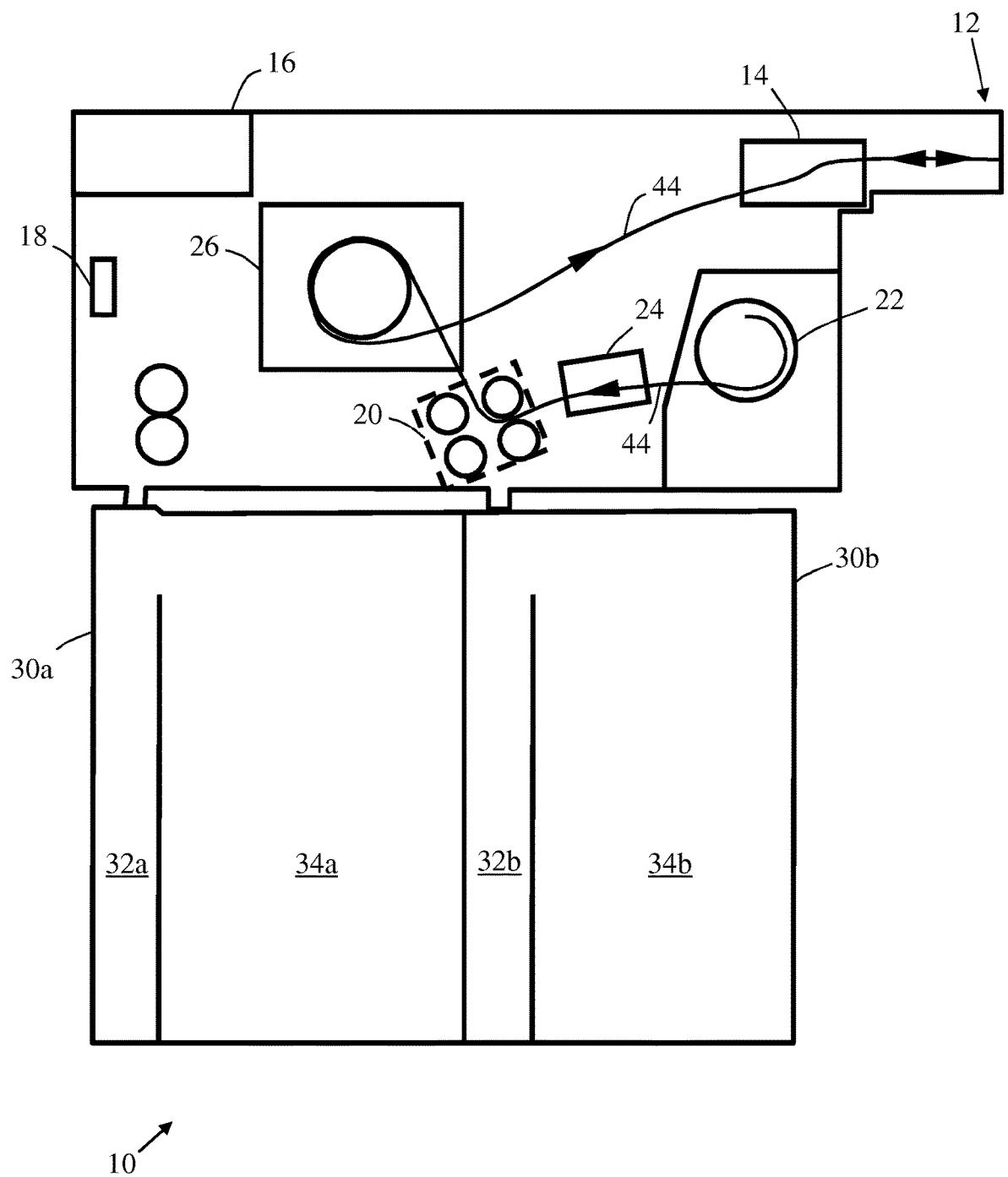
FIG. 4 is a schematic diagram of the media depository of FIG. 1, illustrating a media item return path.

FIG. 4 illustrates a media item return path 44, in which a media item is transported from the escrow 22, passed the printer 24, to the four-way diverter 20. From the four-way diverter 20 the media item is transported to the rebuncher 26. The rebuncher 26 collates all of the media items stored in the escrow 22 that are to be returned to the customer. Once all of these media items have been collated, they are transported as a bunch along the remaining portion of the return path 44 to the item separator/presenter module 14. The item separator/presenter module 14 presents the bunch of media items to the customer at the in/out port 12.

Figure 5:
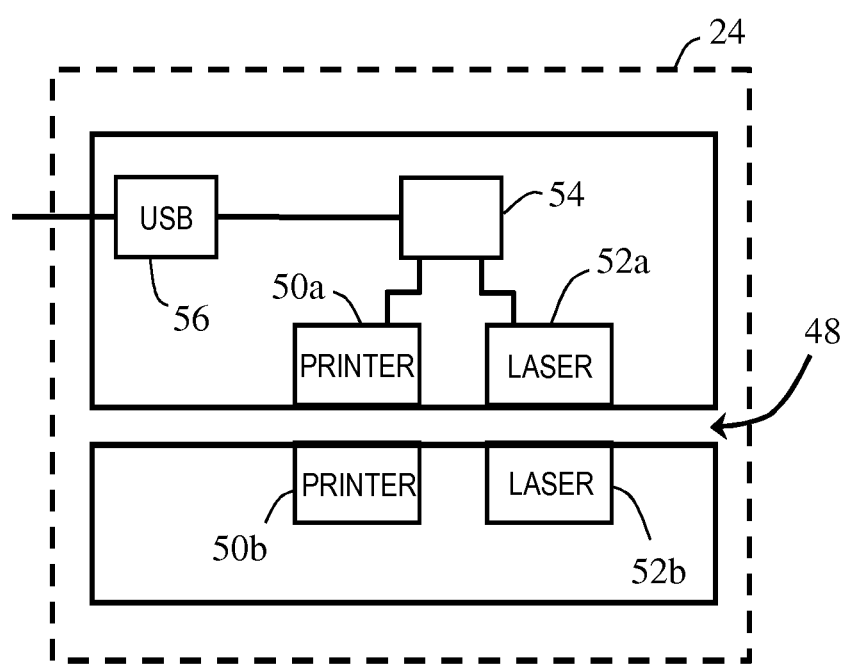
FIG. 5 is a block diagram of a part (the printer) of the media depository of FIG. 1.

Reference will now also be made to FIG. 5, which is a block diagram illustrating the printer 24 in more detail. The printer 24 straddles both sides of the transport path so that a media item passes through the printer as it is conveyed along the media item input path 40, the storage path 42, or the return path 44.

The printer 24 defines a transport section 48 therethrough. The transport section 48 allows media items, such as checks, to pass through the printer 24, and may include skid plates and endless belts protruding therethrough. The printer 24 also comprises a pair of conventional print heads 50a,b (which may comprise an inkjet, ribbon, thermal, or any other convenient printing mechanism) for printing characters onto a check as the check is transported along that part of the transport path. The transport path may be implemented using endless belts, skid plates, rollers, a gear train, or the like.

The print heads 50a,b are located on either side of the transport path. The printer 24 also comprises a pair of ablation mechanisms 52a,b in the form of a pair of high intensity light sources. In this embodiment, the high intensity light source is a pulsed light LED laser diode. The reason that two print heads 50a,b and two ablation mechanisms 52a.b are provided is to enable the rear of a check to be endorsed, and the front of a check to be ablated, regardless of the orientation of the check in the media depository 10.

A controller 54 is provided that selectively controls the print heads 50a,b and the ablation mechanisms 52a,b as necessary to endorse a rear side of a check and to ablate a MICR line from a front side of a check.

The printer 24 also includes a communications port 56 (in the form of a USB port) for communicating with a controller (not shown) in the media depository 10.

Figure 6:
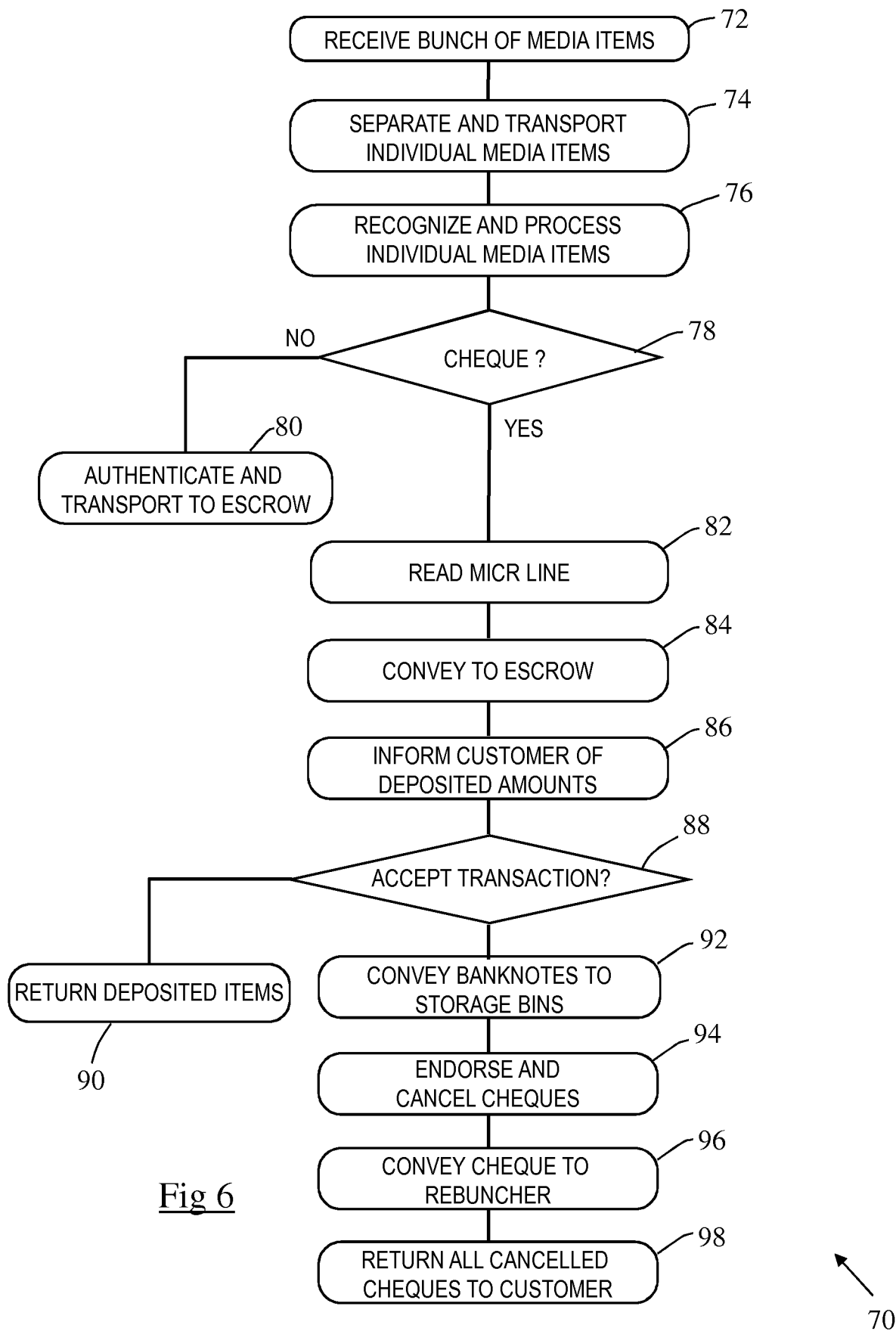
FIG. 6 is a flowchart illustrating steps performed by the media depository of FIG. 1 in cancelling a media item (in the form of a check) inserted by a customer of the media depository.

Reference will now also be made to FIG. 6, which is a simplified flowchart 70 illustrating steps performed by the media depository 10 in cancelling a media item (in the form of a check) inserted by a customer.

Initially, the customer inserts a bunch of checks or mixed checks and banknotes (that is, a bunch of media items), and the bunch is received at the in/out port 12 (step 72). The item separator/presenter module 14 then separates and transports individual media items from the bunch (step 74) as is conventional for a bunch depository.

The individual media items are recognized by the MIV 16 (step 76) to ascertain if the media item is a banknote or a check (step 78).

If the media item is a banknote, it is authenticated. Authenticated banknotes are conveyed to the escrow 22 (step 80) via media item input path 40. Banknotes that are counterfeit may be returned to the customer or sent to the reject compartment 32 of one of the storage bins 30.

Checks are read by the MICR reader 18 (step 82) and then conveyed to the escrow 22 (step 84) via media item input path 40.

Once all of the deposited checks and banknotes have been recognized and/or authenticated, the customer is informed about the amount of cash and the value of checks deposited (step 86) and asked if he/she wants to complete the transaction (step 88).

If the customer does not want to complete the transaction then all of the deposited media items are returned to the customer via the rebuncher 26 (step 90) via the media item return path 44.

If the customer does want to complete the transaction then the banknotes are conveyed to one or both of the storage bins 30 (step 92) and the checks are endorsed and cancelled by the printer 24 (step 94). This cancellation step involves three sub-steps.

The first sub-step is for the controller 54 to receive information from the MIV 16 and MICR reader 18 about the orientation of the check. The second sub-step is for the controller 54 to identify the correct ablation mechanism 52a or 52b depending on the orientation of the check. The third sub-step is for the controller 54 to activate the identified ablation mechanism (for example, 52a) so that the MICR line printed on the check is ablated (that is, any visible and/or magnetic ink pre-printed on the check (typically what is referred to as the MICR line) is burned off so that the check can no longer be read by an optical or MICR reader). This ensures that the check cannot be automatically processed again.

Once the ink has been removed, the check is conveyed to the rebuncher 26 (step 96). Once all of the checks deposited by the customer have been cancelled and transported to the rebuncher 26, the bunch of cancelled checks is then transported to the in/out port 12 and presented to the customer for removal (step 98). The customer then takes the cancelled checks.

This embodiment has the advantage that valuable storage space within the media depository 10 is not used up by checks. In addition, by locating the printer 24 between the four-way diverter 20 and the escrow 22, it is possible to cancel checks as they are being transported along the return path 44 without having to change the direction of transport of the checks.

Various modifications may be made to the above described embodiment within the scope of the invention, for example, in other embodiments, the ablation mechanism 52 may be located at a different position on the transport path to the printer. In other embodiments, the ablation mechanism 52 may replace a printer.

In other embodiments, a cancelled check may be fed back through the media item input path 40 to confirm that the MICR line has been ablated. This may be implemented, for example, using OCR on images of the front and rear of the cancelled check (implemented by the MIV 16), or the MICR reader 18.

In other embodiments, the printer 24 may only have one print head, or may have a print head on only one side of the transport path (rather than on opposing sides of the transport path.

In other embodiments, instead of ablating ink printed on the media item (check), the printer may print cancellation information (textual or pictorial) onto the media item. For example, the printer may print the word "Cancelled", "Void", or the like, on the media item.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive.

The reader's attention is directed to all papers and documents which are filed concurrently with or previous to this specification in connection with this application and which are open to public inspection with this specification, and the contents of all such papers and documents are incorporated herein by reference.

What is claimed is:

1. A media depository comprising:
   media item validation module;
   a diverter for routing a received media item via either a storage path or a return path, wherein the diverter is a four-way diverter;
   an escrow for temporarily holding received media items;
   a printer located between the diverter and the escrow so that the printer can print on any media items transported via the return path, wherein the storage path and all other storage paths start at the escrow and lead to the diverter, wherein the printer includes a first print head on a first side of the storage path and a second print head on a second and opposite side of the storage path; and a pair of high intensity light sources included with the printer, wherein the pair of high intensity light sources are pulsed Light Emitting Diodes, where a first high intensity light source is situated on the first side of the storage path and a second high intensity light source is situated on the second side of the storage path, and wherein one of: the first print head and the second print head is activated and adapted to endorse the media items' rear sides of each media item based on determined orientations for the media items as oriented on the storage path and as determined by a Magnetic Ink Character Recognition (MICR) reader, and wherein one of: the first high intensity light source and the second high intensity light source is selectively activated and adapted to ablate or vaporize toner and/or magnetic ink representing a MICR line from front sides of the media items based on the determined orientations for the media items as oriented on the storage path when the media items are fed onto the storage path in a first orientation with the rear sides of the media items facing up and when the media items are fed onto the storage path in a second orientation with the front sides of the media items facing up, wherein each of the high intensity light sources are adapted to perform ablation on the toner and/or the magnetic ink; and a light source cut-off adapted to turn off the first and second high intensity light sources when a temperature at an area illuminated by the first and second high intensity light sources exceeds a predefined level.

2. A media depository according to claim 1, wherein the media depository further comprises a media item in/out port for receiving and returning media items.

3. A media depository according to claim 1, wherein the media depository further comprises a media item input port and a separate media item output port.

4. A self-service terminal including the media depository according to claim 1.

5. A method of transporting a media item within a media depository, the method comprising:
  receiving a media item at an input port;
  identifying an orientation of the media item as oriented on a storage path based on a determined orientation for the media item provided by a Magnetic Ink Character Recognition (MICR) reader;
  routing the received media item to an escrow;
  transporting the received media item from the escrow towards a diverter along the storage path;
  adjusting print on the received media item prior to the media item reaching the diverter, wherein adjusting further includes selectively activating and adjusting one of: a first print head located on a first side of the storage path and a second print head located on a second and opposite side of the storage path based on the determined orientation for the media item, and wherein adjusting further includes selectively activating and adjusting one of: a first pulsed Light Emitting Diode (LED) located on the first side of the storage path and a second pulsed LED located on a second side of the storage path based on the determined orientation for the media item, and ablating or vaporizing a MICR line from a front side of the media item based on the determined orientation when the media item is fed onto the storage path in a first orientation with a rear side of the media item facing up and when the media item is fed onto the storage path in a second orientation with the front side of the media item facing up, wherein each of the first pulsed LED and the second pulsed LED are adapted to perform ablation on the MICR line; and
  shutting off the first pulsed LED and the second pulsed LED when a temperature at an area illuminated by the first pulsed LED and the second pulsed LED exceeds a predefined level.

6. A method according to claim 5, wherein adjusting print on the recognized media item comprises adding print to the media item.

7. A method according to claim 5, wherein adjusting print on the recognized media item comprises removing print from the recognized media item.

8. A method according to claim 7, wherein removing print from the recognized media item further comprises activating one of: the first pulsed LED and the second pulsed LED to ablate the ink.

9. A method of cancelling a media item received in a media depository from a customer, the method comprising:
  receiving a media item at an input port;
  identifying an orientation of the media item as oriented on a storage path based on a determined orientation for the media item provided by a Magnetic Ink Character Recognition (MICR) reader;
  processing the received media item to provide a cash value therefore;
  adjusting print on the processed media item before the processed media item reaches an escrow along a storage path, wherein adjusting further includes selectively activating and adjusting one of: a first print head located on a first side of the storage path and a second print head located on a second and opposite side of the storage path based on the determined orientation for the media item, and wherein adjusting further includes selectively activating and adjusting one of: a first pulsed Light Emitting Diode (LED) located on the first side of the storage path and a second pulsed LED located on a second side of the storage path based on the determined orientation for the media item, and ablating or vaporizing a MICR line from a front side of the media item based on the determined orientation when the media item is fed onto the storage path in a first orientation with a rear side of the media item facing up and when the media item is fed onto the storage path in a second orientation with the front side of the media item facing up, wherein each of the first pulsed LED and the second pulsed LED are adapted to perform ablation on the MICR line;
  shutting off the first pulsed LED and the second pulsed LED when a temperature at an area illuminated by the first pulsed LED and the second pulsed LED exceeds a predefined level; and
  returning the media item to the customer with modifications made by the adjusting.

* * * * *